(12) United States Patent
Wardojo et al.

(10) Patent No.: US 11,971,595 B1
(45) Date of Patent: Apr. 30, 2024

(54) BREATHABLE OUTDOOR NETWORK TERMINAL ENCLOSURE

(71) Applicant: FRONTIER COMMUNICATIONS HOLDINGS, LLC, Dallas, TX (US)

(72) Inventors: Erwin Wardojo, McKinney, TX (US); John Valdez, Copper Canyon, TX (US)

(73) Assignee: FRONTIER COMMUNICATIONS HOLDINGS, LLC, Dallas, TX (US)

( * ) Notice: Subject to any disclaimer, the term of this patent is extended or adjusted under 35 U.S.C. 154(b) by 0 days.

(21) Appl. No.: 18/242,848

(22) Filed: Sep. 6, 2023

(51) Int. Cl.
*G02B 6/44* (2006.01)
*G02B 6/42* (2006.01)

(52) U.S. Cl.
CPC ......... *G02B 6/4441* (2013.01); *G02B 6/4268* (2013.01); *G02B 6/4401* (2013.01)

(58) Field of Classification Search
None
See application file for complete search history.

(56) References Cited

U.S. PATENT DOCUMENTS

| | | | |
|---|---|---|---|
| 10,353,163 B1* | 7/2019 | Hanks | G02B 6/4448 |
| 11,592,638 B2* | 2/2023 | Craft, Jr. | G02B 6/4441 |
| 2011/0058785 A1* | 3/2011 | Solheid | G02B 6/4452 |
| | | | 385/135 |
| 2013/0084050 A1* | 4/2013 | Vastmans | H02G 15/076 |
| | | | 361/679.01 |
| 2015/0139598 A1* | 5/2015 | Barnes | G02B 6/4469 |
| | | | 29/428 |
| 2016/0033730 A1* | 2/2016 | Vastmans | G02B 6/3837 |
| | | | 385/135 |
| 2019/0154939 A1* | 5/2019 | Powell | G02B 6/445 |
| 2019/0346644 A1* | 11/2019 | Hill | G02B 6/3825 |
| 2021/0373268 A1* | 12/2021 | Craft, Jr. | H05K 7/2039 |

* cited by examiner

*Primary Examiner* — Jerry Rahll
(74) *Attorney, Agent, or Firm* — MARSHALL, GERSTEIN & BORUN LLP (57) ABSTRACT

An enclosure for retaining at least one networking component includes a shell including a rear wall, a first sidewall, a second sidewall, an upper wall, and a lower wall that cooperate to retain the at least one networking component, a cover adapted to operably couple with the shell to define an interior volume, at least one venting member, at least one networking component mounting member, and a structure mounting member. The at least one venting member is defined by a portion of the shell to permit airflow from the interior volume to an exterior environment. The at least one networking component mounting member retains the at least one networking component. The structure mounting member is at least partially disposed on an outer surface of the shell to secure the shell with a portion of a structure.

22 Claims, 8 Drawing Sheets

BREATHABLE OUTDOOR NETWORK TERMINAL ENCLOSURE

FIELD OF THE DISCLOSURE

This disclosure relates generally to networking systems, and, more particularly, to breathable outdoor enclosures for networking systems.

BACKGROUND

A conventional passive optical network (PON) includes one or more optical line terminals (OLTs) at a central location connecting to one or more optical last mile termination units (LMTUs) disposed at respective customer premises (e.g., physical locations serviced by the PON) via one or more optical fibers. A PON is typically implemented using a point-to-multipoint topology in which a feeder optical fiber from an OLT serves multiple last mile termination units. In some examples, an LMTU may be in the form of an optical network terminal (ONT) or an optical network unit (ONU) that is optically connected to the OLT via a respective distribution optical fiber received at the LMTU. Such ONTs are typically disposed within enclosures that may be affixed to a structure, a pole, and/or other suitable stationary objects.

Because of continued advancements to PON technologies, better and/or higher-powered ONTs have been developed which may generate more heat during use as compared with conventional devices. As a result, because such ONTs are retained in enclosures (which, in many instances are completely sealed) that may be themselves exposed to the environment (e.g., ambient conditions such as heat and/or direct sunlight), these devices may quickly experience overheating, which in turn may result in performance degradation. To ensure customers continue to receive expected network performance, service providers may need to position blocking covers or similar devices to provide adequate shading for such enclosures, which may increase overall equipment and installation costs while reducing technician efficiencies. Further, service provides may need to frequently repair and/or replace such devices, which may increase overall costs and resources.

Accordingly, there is a need for improved devices having improved functionalities.

SUMMARY

In an embodiment, an enclosure for retaining at least one networking component includes a shell including a rear wall, a first sidewall, a second sidewall, an upper wall, and a lower wall that cooperate to retain the at least one networking component, a cover adapted to operably couple with the shell to define an interior volume, at least one venting member, at least one networking component mounting member, and a structure mounting member. The at least one venting member is defined by a portion of the shell to permit airflow from the interior volume to an exterior environment. The at least one networking component mounting member retains the at least one networking component, which, in some examples, may be in the form of an optical network terminal (ONT). The structure mounting member is at least partially disposed on an outer surface of the shell to secure the shell with a portion of a structure.

In some examples, the cover includes a front plate defining a plane and an upper wall extending therefrom. The upper wall may extend obliquely from the plane defined by the front plate. In some approaches, the at least one venting member may include a membrane. For example, the membrane may be in the form of a breathable, waterproof fabric permeable to air and water vapor.

In some forms, the enclosure may additionally include at least one radiant barrier coupled with the shell to reduce a UV load within the interior volume from the exterior environment. In these and other forms, the enclosure may further include at least one solar shield coupled with the shell or the cover to redirect a UV load from the exterior environment.

In these and other examples, the enclosure may include a projection wall positioned at or near the rear wall. The projection wall may couple the shell with a building structure such that the rear wall is offset from the building structure. The projection wall may define a fiber slack tray having a venting member. The enclosure may additionally include at least one cooling member that circulates air between the exterior environment and the interior volume.

In accordance with a second aspect, a retrofit kit for an enclosure that retains at least one networking component is provided. The retrofit kit includes a cover, a first venting member, and a first shield. The cover includes a front plate, a first sidewall, a second sidewall, an upper wall, and a lower wall that cooperate to define a cover interior volume. The first venting member is at least partially defined by a portion of the upper wall of the cover to permit airflow from the cover interior volume to an exterior environment. The first shield extends from the front plate of the cover and being positioned adjacent to the upper wall thereof. The first shield and the upper wall cooperate to define a gap through which air from the cover interior volume may flow to the exterior environment.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate examples of concepts that include the claimed invention, and explain various principles and advantages of those examples.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various examples. Also, common but well-understood elements that are useful or necessary in a commercially feasible examples are often not depicted in order to facilitate a less obstructed view of these various examples. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

The apparatus and method components have been represented where appropriate by conventional symbols in the drawings, showing only those specific details that are pertinent to understanding examples of the present disclosure so as not to obscure the disclosure with details that will be readily apparent to those of ordinary skill in the art having the benefit of the description herein.

Although the figures show parts with clean lines and boundaries, some or all of these lines and/or boundaries may be idealized. In reality, the boundaries and/or lines may be unobservable, blended, and/or irregular. Use of terms such as up, down, top, bottom, side, end, front, back, etc. herein are used with reference to a currently considered or illustrated orientation. If they are considered with respect to another orientation, it should be understood that such terms must be correspondingly modified.

DETAILED DESCRIPTION

Disclosed examples of the disclosure provide a number of advantages over existing techniques for retaining components of passive optical networks (PONs) while providing for increased thermal dissipation. Generally speaking, a component of a PON, as utilized herein, may be in the form of a last mile termination unit (e.g., an optical network terminal (ONT) or an optical network unit (ONU) disposed at customer premises). Such a component may be retained within an enclosure using a bracket or locking apparatus. The enclosures described herein may accommodate advanced and/or higher powered networking components while allowing for adequate hot air dissipation and/or breathability to reduce and/or eliminate occurrences of overheating or other damaging events. More specifically, the enclosure may incorporate passive and/or active cooling measures that may take advantage of thermal conductivity properties to replace hot air within the enclosure with cooler air from the external environment. Further, in some examples, a retrofit kit may be provided that may allow for existing portions of enclosures to be reused while still providing increased breathability.

Turning now to the Figures, an enclosure 100 is provided for retaining at least one networking component 10 (e.g., an ONT, ONU, and/or any other device). The enclosure 100 may include a shell 102 and a cover 120. More specifically, the illustrated shell 102 of the enclosure 100 includes a rear wall 103a, a first sidewall 103b, a second sidewall 103c, an upper wall 103d, and a lower wall 103e. It is to be appreciated that in some examples, each of the walls and sidewalls 103a, 103b, 103c, 103d, 103e may be formed from discrete components that are operably coupled together via any number of suitable approaches (e.g., fusion welding, adhesives, fasteners, etc.), and in some examples, any number of these components may be integrally formed. While the illustrated enclosure 100 is in the form of a generally rectangular box, it is to be appreciated that the enclosure 100 may take any number of suitable shapes, forms, and/or configurations. Notably, and as illustrated in FIG. 2, the upper wall 103d is angled downwardly relative to a horizontal plane in a direction towards the rear wall 103a, and the lower wall 103e is angled upwardly relative to a horizontal plane in a direction towards the rear wall 103a.

The shell 102 further includes a networking component mounting member 108 used to retain the networking component 10 therein. In some examples, the networking component mounting member 108 may be in the form of a track positioned or otherwise disposed on the rear wall 103a that receives a sliding bracket member (not illustrated) coupled with the networking component 10. In other examples, the networking component mounting member 108 may include a hook and loop fastener member that may wrap around a portion of the networking component 10. It is to be appreciated that any number of suitable approaches may be used to couple the networking component 10 with the shell 102.

A structure mounting member 112 is provided to couple the shell 102 with a structure 12. In some forms, the structure 12 may be a wall of a building, a frame, a post, or other generally upright object. In some examples, the structure mounting member 112 may be in the form of a throughbore or opening formed on or through a portion of the shell (e.g., the rear wall 103a) that a bolt or similar fastener is disposed therethrough to engage the structure 12. In other examples (not illustrated), the structure mounting member 112 may be in the form of a mounting bracket that is itself secured to the structure 12, whereupon the shell 102 may be coupled with the bracket to retain the enclosure 100. Other suitable examples are possible.

Figure 1:
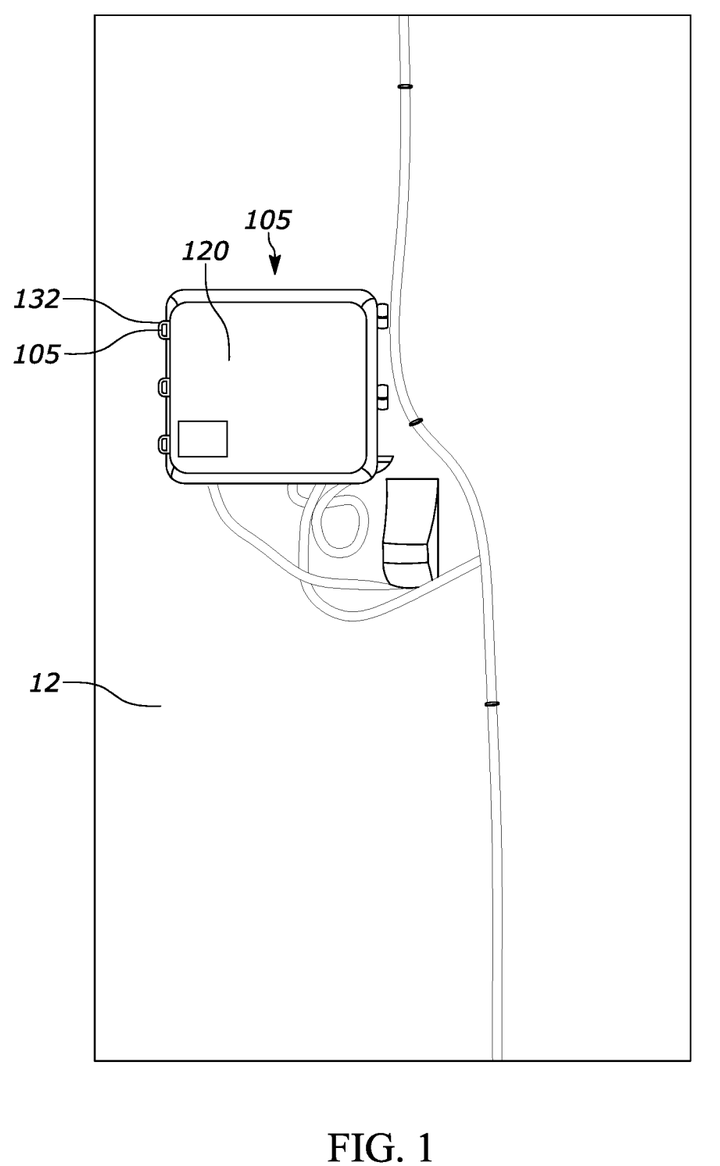
FIG. 1 is a perspective view of an example enclosure for retaining at least one networking component in which the systems, methods, and/or techniques of the present disclosure may be implemented.
Figure 2:
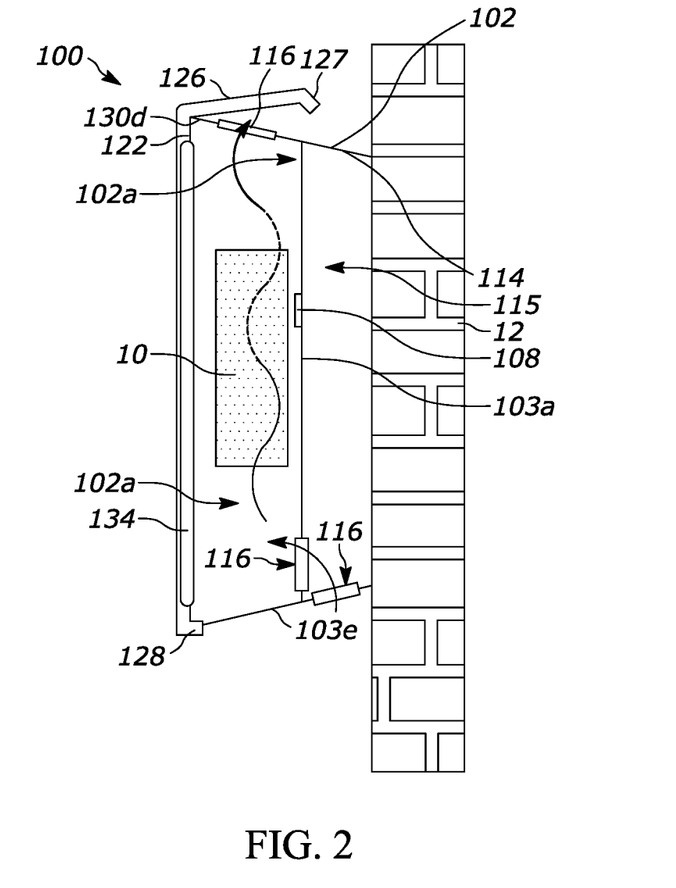
FIG. 2 is a side elevation view of the example enclosure of FIG. 1 in accordance with various examples.

As illustrated in FIG. 2, in some examples, the shell 102 may additionally include a projection wall 114 positioned at or near the rear wall 103a. The projection wall 114 may be operably coupled or otherwise formed with portions of the shell 102 via any number of suitable approaches. In these examples, the projection wall 114 is adapted to couple with the structure 12. As previously stated, any number of suitable approaches may be implemented to mount/couple the projection wall 114, and thus the shell 102, with the structure 12.

In some examples, the projection wall 114 is in the form of a sidewall extending about the periphery of the shell 102. As illustrated in FIG. 2, the projection wall 114 may generally extend at a similar angle relative to a horizontal plane as the upper and lower walls 103d, 103e, respectively. Put differently, the projection wall may have a generally trapezoidal cross-sectional shape. Other examples are possible.

When the enclosure 100 is provided with a projection wall 114, an interior cavity 115 is formed between the structure 12 (or a rearmost surface of the projection wall 114, if so equipped) and the rear wall 103a. such an interior cavity 115 may be used as a fiber slack storage tray to store or loop additional fiber or other data transmission cabling used to transmit data and/or power to and from the networking component 10. Such an arrangement may allow the rear wall 103a to be offset a desired distance from the structure 12.

The cover or door 120 operably couples with the shell 102 using any number of suitable approaches. The cover 120 may include a front plate 122, an upper wall 126, a lower wall 128, and any number of sidewalls 130. In some examples, a portion of the shell (e.g., the first and/or the second sidewall 103b, 103c may include any number of shell hinge members 105 disposed thereon or otherwise coupled therewith that may hingedly engage with a corresponding number of cover hinge members 132 disposed on or otherwise coupled with the cover 120. In some examples, such cover hinge members 132 may be disposed on a portion of the sidewall 130 and/or a portion of the upper or lower walls 126, 128. It is to be appreciated that other examples of suitable mechanisms for coupling the cover 120 with the shell 102 are possible, but in general, the cover 120 cooperates with the shell 102 to define an interior volume 102a within which the networking component 10 is disposed. Further, the cover 120 and/or shell 102 may include any number of securing or locking mechanisms to retain the cover 120 in a closed configuration.

The enclosure 100 may include any number of venting members 116. In some examples, such venting members 116 are defined by a portion of the shell 102 and/or the cover. More specifically, with reference to FIGS. 2-5, a first venting member or members 116a is provided in the form of a number of holes, openings, and/or throughbores positioned on the upper wall 103d of the shell 102. It is to be appreciated that the holes, openings, and/or throughbores may be provided in any number and have any desired shape. The first venting member(s) 116a are provided to allow heat generated or otherwise retained within the interior volume 102a (e.g., by the networking component 10) to be exhausted or otherwise expelled from the interior volume 102a. Notably, such first venting member(s) are positioned at a location that is above the position of the networking component 10 to take advantage of natural convection of the generated hot air that rises towards the upper wall 103d.

A second venting member (or members) 116b is also provided in the form of a number of holes, openings, and/or throughbores positioned at a location generally below that of the networking component 10. More specifically, in examples where the enclosure 100 includes a projection wall 114, the first venting member 116b may be in the form of holes, openings, and/or throughbores positioned on the projection wall as well as the rear wall 103a. Such holes, openings, and/or throughbores permit air from the external environment to enter into the interior volume 102a (by first entering the interior cavity 115.

In operation, the first and second venting members 116a, 116b cooperate to create a passive chimney effect where cooler air from the environment external to the enclosure 100 flows into the interior volume 102a to reduce the temperature thereof. More specifically, as shown in FIG. 2, cooler air enters the interior cavity 115 via the second venting member(s) 116b, and subsequently enters the interior volume 102a. A draft is created whereby the hot air generated by the networking component 10 is urged from the interior volume 102a through the first venting member(s) 116a. A pressure differential results within the interior volume 102a such that cooler air is drawn into the interior volume 102a via the second venting member(s) 116b. As a result, the enclosure 100 may generate consistent passive airflow across the networking component 10, thereby reducing the ambient temperature within the interior volume 102a.

While the illustrated examples depict a second venting member 116 in the form of openings or throughbores positioned on both the projection wall 114 and the rear wall 103a, in some forms, the second venting member 116 may merely be disposed on the lower wall 103e. Additionally, it is to be appreciated that in examples where the enclosure 100 does not include a projection wall 114, the second venting member may be disposed on the lower wall 103e as opposed to the rear wall 103a due to the rear wall 103a potentially abutting the structure 12, which may potentially restrict airflow into the interior volume 102a. However, it is to also be appreciated that in some examples (e.g., in instances where the structure is in the form of a post, a tree, or similar object), the structure 12 may not be flush with an entirety of the rear wall 103a, and as such, the second venting member may still be disposed on a portion of the rear wall 103a.

In some examples, the venting members 116 may be protected from the elements using a membrane that at least partially covers the hole, opening, and/or throughbores. In some examples, the membrane may be constructed from a breathable, waterproof fabric permeable to air and water vapor. Such a material may be dense enough to prevent moisture from passing into the interior volume 102a, but large enough for air to pass through for cooling purposes.

Figure 3:
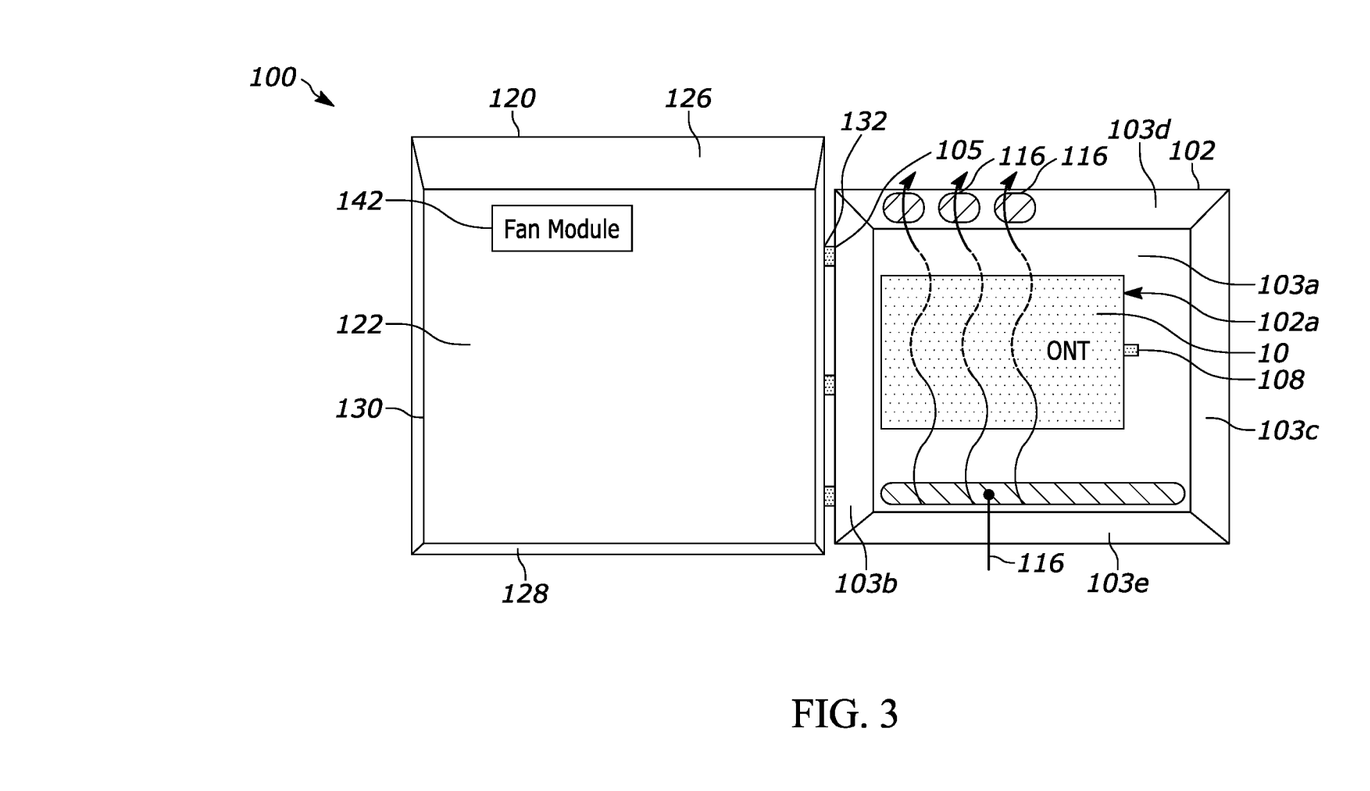
FIG. 3 is a front elevation schematic view of the example enclosure of FIGS. 1 & 2 in an open configuration in accordance with various examples.
Figure 4:
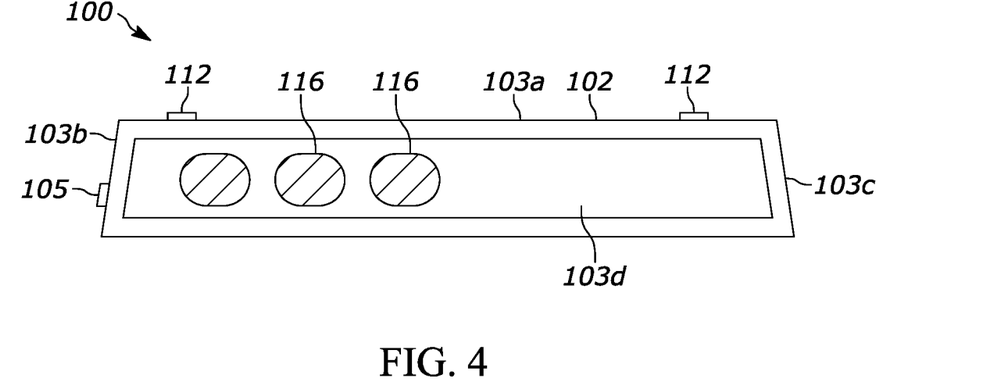
FIG. 4 is a top plan view of the example enclosure of FIGS. 1-3 in accordance with various examples.
Figure 5:
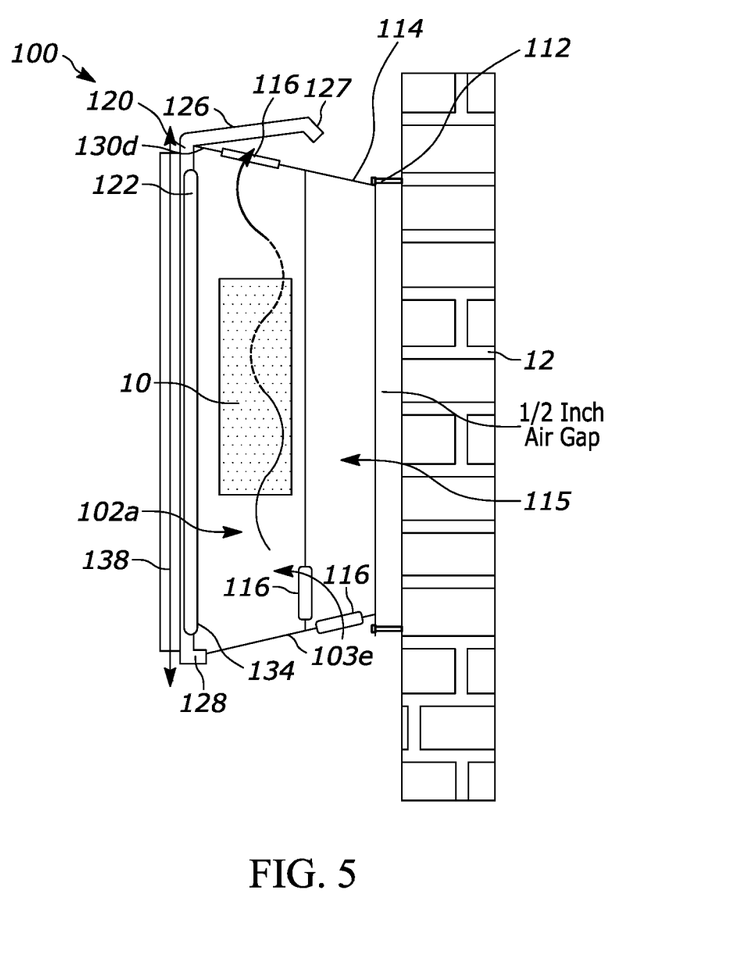
FIG. 5 is a side elevation view of the example enclosure of FIGS. 1-4 having an example solar shield member and example radiant barrier in accordance with various examples.
Figure 6:
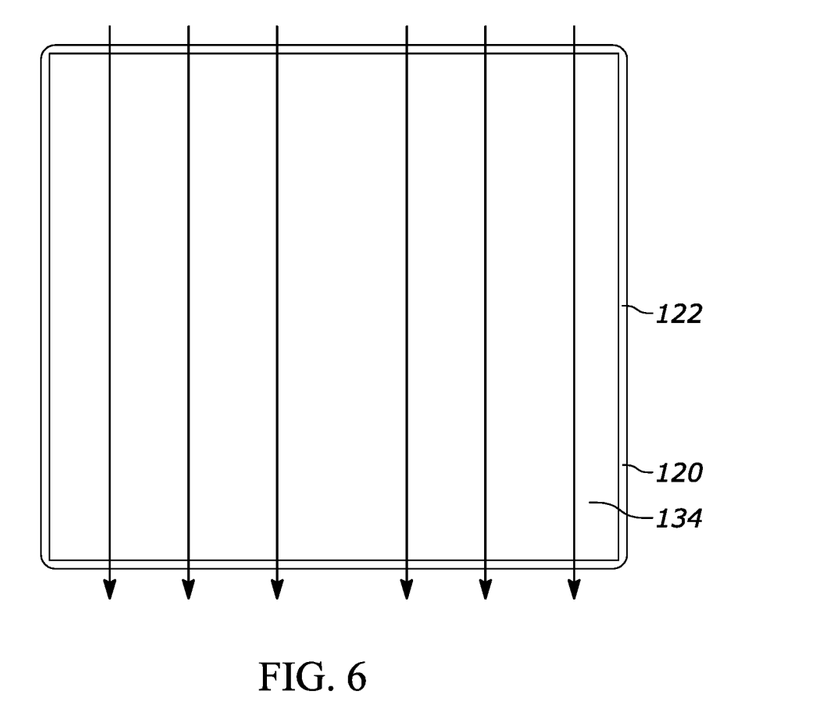
FIG. 6 is a front elevation view of the example enclosure of FIG. 5 in accordance with various examples.
Figure 7:
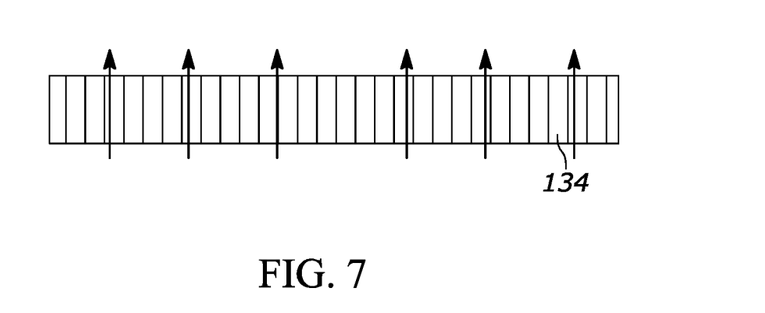
FIG. 7 is a top plan view of the example solar shield for use with the example enclosure of FIGS. 5 & 6 in accordance with various examples.

As illustrated in FIGS. 2 & 3, the upper wall 126 of the cover 120 is angled in an opposite direction (i.e., upwardly) relative to a horizontal plane in a direction towards the rear wall 103a of the shell 102a. Put differently, the upper wall 126 of the cover 120 extends obliquely from a plane defined by the front plate 122. As a result, the upper wall 126 may cause rain or other debris to move towards the front plate 122 and away from the enclosure 100 as opposed to moving towards the structure 12 or portions of the shell 102. The upper wall 126 may also include an extension 127 angled downwardly that additionally deflects rain or other debris from contacting the venting member(s) 116.

The enclosure 100 may include any number of additional features to assist with enhancing the breathability thereof. For example, the enclosure 100 may include an active cooling member 142 such as a fan to push or draw air through the interior volume 102. More specifically, as illustrated in FIG. 3, a cooling member 142 may be positioned generally above the networking component 10. Such a fan may be arranged to push air out of the first venting member(s) 116a, thereby drawing cooler air across the networking member 10 in this process. Additionally or alternatively, a cooling member may be provided near the second venting member(s) 116 that draws air into the interior volume 102a while also forcing air across the networking component 10.

In some implementations, the enclosure 100 may include additional components that may reduce the heat generated by the enclosure 100 itself due to ambient conditions. For example, the enclosure 100 may include a radiant barrier 134 disposed inside the cover 120 and/or shell 102 (e.g., positioned on an interior surface of the front plate 122). The radiant barrier 134 may be provided to reduce an overall UV load experienced by the enclosure 100 so that the shell 102 and/or the cover 120 do not absorb additional heat.

Further, in some examples, a solar shield 138 may be provided in the form of a double-walled member having cavities allowing air to flow freely therethrough. As with the radiant barrier 134, the solar shield 138 may be provided to reduce an overall UV load experienced by the enclosure 100.

The solar shield may cover all or a portion of the front plate 122 and/or other surfaces of the enclosure 100 that may be exposed to solar radiation.

Figure 8:
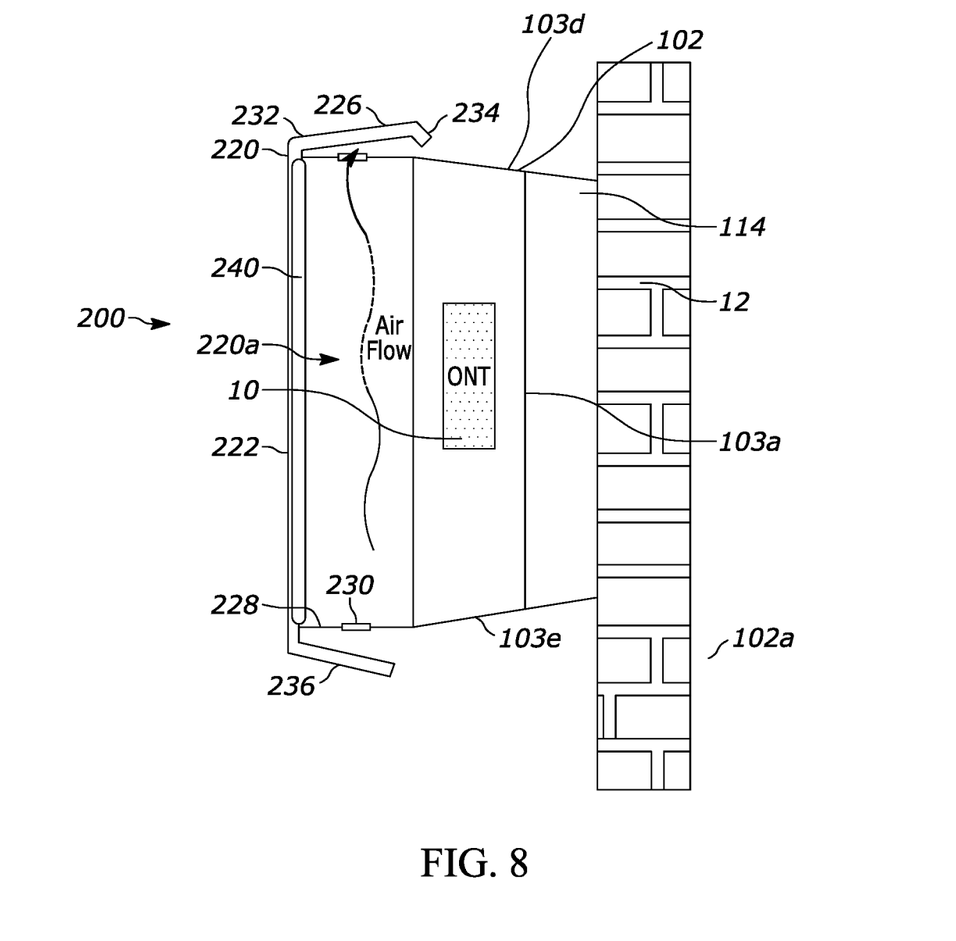
FIG. 8 is a side elevation view of an example enclosure having an example retrofit kit coupled therewith in accordance with various examples.
Figure 9:
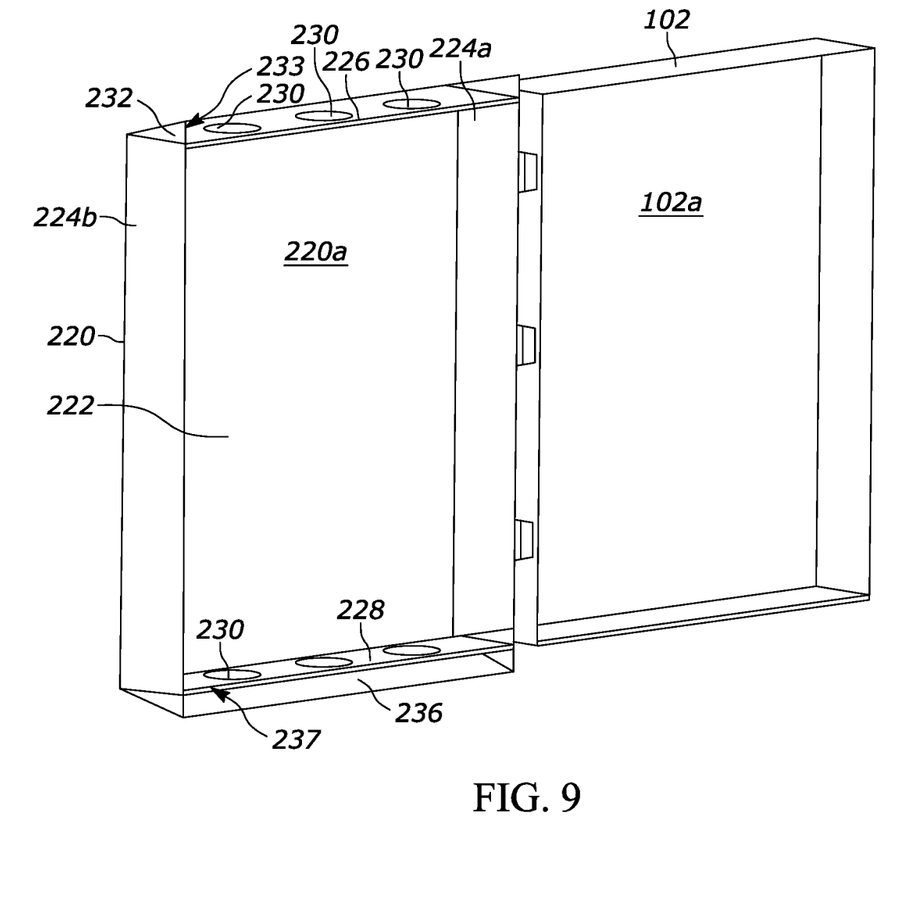
FIG. 9 is a perspective view of the example enclosure having the example retrofit kit of FIG. 8 in accordance with various examples.
Figure 10:
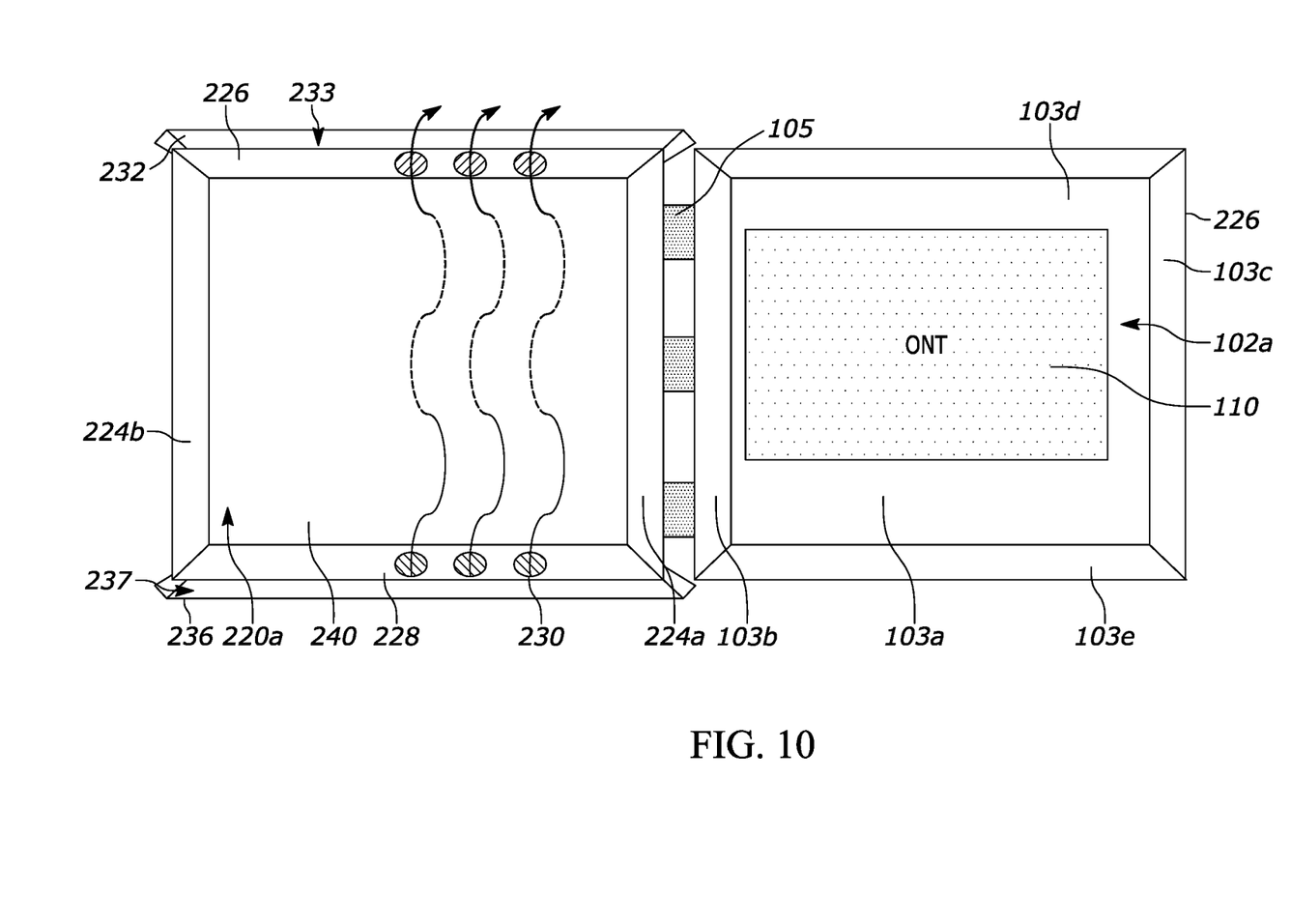
FIG. 10 is a front plan view of the example enclosure of FIGS. 8 & 9 in accordance with various examples.

With reference to FIGS. 8-10, an alternative enclosure 200 is provided that includes a retrofit cover 220. This retrofit cover 220 may replace an existing enclosure cover using the coupling mechanism(s) (e.g., hinge members) previously provided to secure the existing enclosure cover with the shell. It is to be appreciated that the retrofit cover 220 may include similar features as the cover 120 described herein.

More specifically, the retrofit cover 220 includes a front plate 222, a first sidewall 224a, a second sidewall 224b, an upper wall 226, and a lower wall 228 that cooperate to define a cover interior volume 220a. In the illustrated examples, each of the upper and lower walls 226, 228 include at least one venting member 230 in the form of openings, holes, and/or throughbores formed therethrough. The retrofit cover 220 additionally includes a first shield 232 that extends from the front plate 222 and a second shield 236 that extends from the front plate 222. More specifically, the first shield 232 is positioned adjacent to the upper wall 226, and is provided to shield the venting members 230 disposed thereon/therethrough. As with the upper wall 126 of the cover 120, the first shield 232 is angled upwardly relative to a horizontal plane in a direction towards the structure 12. Put differently, the first shield 232 extends obliquely from a plane defined by the front plate 222. As a result, the first shield 232 may cause rain or other debris to move towards the front plate 222 and away from the enclosure 200 as opposed to moving towards the structure 12 or portions of the shell. The first shield 232 may also include a shield extension member 234 angled downwardly that additionally deflects rain or other debris from contacting the venting member(s) 230.

The second shield 236 is positioned adjacent to the lower wall 228, and is provided to shield the venting members 230 disposed thereon/therethrough. As with the lower wall 128 of the cover 120, is angled downwardly relative to a horizontal plane in a direction towards the structure 12. As a result, the second shield 236 may block or otherwise restrict foreign objects from contacting the venting members 230.

As with the previous examples, the venting members 230 may be protected from the elements using a membrane that at least partially covers the hole, opening, and/or throughbores. In some examples, the membrane may be constructed from a breathable, waterproof fabric permeable to air and water vapor. Such a material may be dense enough to prevent moisture from passing into the interior volume of the enclosure 100, but large enough for air to pass through for cooling purposes.

The first and second shields 232, 236 define respective gaps 233, 237 between the respective upper and lower walls 226, 228. The gap 233 allows air from the cover interior volume 220a to flow to the exterior environment. The gap 237 allows air from the environment to flow into the cover interior volume 220a.

In any of these examples, all or a portion of the enclosures may be constructed from a heat resistant polymeric material. Such a material may cooperate with, or be used as an alternative to, the previously-described radiant barrier(s) and/or solar shield(s).

Further, it is to be appreciated that any number of suitable alternative arrangements may be implemented in the enclosures described herein. For example, the venting members may be positioned on varying surfaces or structures (e.g., along the first or second sidewalls 103b, 103c, the sidewall 130, the first or second sidewalls 224a, 224b, etc.). Such venting members may be shielded from the external environment using any number of suitable approaches.

So arranged, the enclosures described herein may reduce a temperature therewithin up to approximately 20° C., thereby ensuring the networking components retained therein are capable of operating within their operating temperatures without overheating. As an example, using a convection thermal heat transfer equation $q = hc \, A * \Delta T$, where q equals the heat transfer per unit time (W), A equals the heat transfer area ($m^2$), hc equals a convective heat transfer coefficient in degrees Celsius ($W/m^{2\circ}$ C.), and $\Delta T$ equals a temperature difference of the air inside the enclosure with the venting members described herein as compared with conventional, sealed enclosures, a heat transfer value between approximately 450 and 800 watts per hour may be achieved.

The enclosures described herein advantageously repel heat and/or solar radiation as opposed to the absorption experienced by existing enclosures while still protecting the networking components from environmental hazards such as inclement weather or other damage.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Numerous alternative examples could be implemented, using either current technology or technology developed after the filing date of this patent, which would still fall within the scope of the claims. Additionally, the described embodiments/examples/implementations should not be interpreted as mutually exclusive and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting example the term is defined to be within 10%, in another example within 5%, in another example within 1% and in another example within 0.5%. The term "coupled" as used herein is defined as connected, although not necessarily directly and not necessarily mechanically. A device or structure that is "configured" in a certain way is configured in at least that way, but may also be configured in ways that are not listed.

Further, unless expressly stated to the contrary, "or" refers to an inclusive or and not to an exclusive or. For example, "A, B or C" refers to any combination or subset of A, B, C such as (1) A alone, (2) B alone, (3) C alone, (4) A with B, (5) A with C, (6) B with C, and (7) A with B and with C. As used herein, the phrase "at least one of A and B" is intended to refer to any combination or subset of A and B such as (1) at least one A, (2) at least one B, and (3) at least one A and at least one B. Similarly, the phrase "at least one of A or B" is intended to refer to any combination or subset of A and B such as (1) at least one A, (2) at least one B, and (3) at least one A and at least one B.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, inventive subject matter may lie in less than all features of a single disclosed example. Thus, the following claims are hereby incorporated into the Detailed Description, with each claim standing on its own as a separately claimed subject matter.

By way of example, and not limitation, the disclosure herein contemplates at least the following examples:

1. An enclosure for retaining at least one networking component, the enclosure comprising: a shell including a rear wall, a first sidewall, a second sidewall, an upper wall, and a lower wall that cooperate to retain the at least one networking component; a cover adapted to operably couple with the shell to define an interior volume; at least one venting member defined by a portion of the shell to permit airflow from the interior volume to an exterior environment; at least one networking component mounting member adapted to retain the at least one networking component; and a structure mounting member at least partially disposed on an outer surface of the shell to secure the shell with a portion of a structure.
2. The enclosure of example 1, wherein the cover includes a front plate defining a plane and an upper wall extending therefrom, wherein the upper wall extends obliquely from the plane defined by the front plate.
3. The enclosure of any one of the preceding examples, wherein the at least one venting member includes a membrane.
4. The enclosure of example 3, wherein the membrane includes a breathable, waterproof fabric permeable to air and water vapor.
5. The enclosure of any one of the preceding examples, further comprising at least one radiant barrier coupled with the shell to reduce a UV load within the interior volume from the exterior environment.
6. The enclosure of any one of the preceding examples, further comprising at least one solar shield coupled with the shell or the cover to redirect a UV load from the exterior environment.
7. The enclosure of any one of the preceding examples, further comprising a projection wall positioned at or near the rear wall, the projection wall adapted to couple the shell with a building structure such that the rear wall is offset from the building structure.
8. The enclosure of example 7, wherein the projection wall defines a fiber slack tray having a venting member.
9. The enclosure of any one of the preceding examples, further comprising at least one cooling member adapted to circulate air between the exterior environment and the interior volume.
10. The enclosure of any one of the preceding examples, wherein the at least one networking component comprises an optical network terminal (ONT).
11. A retrofit kit for an enclosure adapted to retain at least one networking component, the retrofit kit comprising: a cover including a front plate, a first sidewall, a second sidewall, an upper wall, and a lower wall that cooperate to define a cover interior volume; a first venting member at least partially defined by a portion of the upper wall of the cover to permit airflow from the cover interior volume to an exterior environment; and a first shield extending from the front plate of the cover and being positioned adjacent to the upper wall thereof; wherein the first shield and the upper wall cooperate to define a gap through which air from the cover interior volume may flow to the exterior environment.
12. The retrofit kit of example 11, wherein the first shield extends obliquely from a plane defined by the front plate.
13. The retrofit kit of example 12, further comprising a shield extension member positioned at a distal end of the first shield, the shield extension member extending in a downward direction relative to the first shield.
14. The retrofit kit of any one of the preceding examples, further comprising a second venting member at least partially defined by a portion of the lower wall of the cover to permit airflow from the exterior environment to the cover interior volume.
15. The retrofit kit of example 14, further comprising a second shield extending from the front plate of the cover, the second shield being positioned adjacent to the lower wall thereof, wherein the second shield and the lower wall cooperate to define a gap through which air from the exterior environment may flow to the cover interior volume.
16. The retrofit kit of any one of the preceding examples, wherein the first venting member includes a membrane.
17. The retrofit kit of example 16, wherein the membrane includes a breathable, waterproof fabric permeable to air and water vapor.
18. The retrofit kit of any one of the preceding examples, further comprising at least one radiant barrier coupled with the cover and/or the shield to reduce a UV load within the interior volume from the exterior environment.
19. The retrofit kit of any one of the preceding examples, further comprising at least one solar shield coupled with the cover and/or the shield to redirect a UV load from the exterior environment.

20. The retrofit kit of any one of the preceding examples, further comprising a hinge member adapted to hingedly couple the cover with a shell of an enclosure for retaining the at least one networking component.

Additionally, the benefits, advantages, solutions to problems, and any element(s) that may cause any benefit, advantage, or solution to occur or become more pronounced are not to be construed as a critical, required, or essential features or elements of any or all the claims.

Finally, any references, including, but not limited to, publications, patent applications, and patents cited herein are hereby incorporated in their entirety by reference to the same extent as if each reference were individually and specifically indicated to be incorporated by reference and were set forth in its entirety herein.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An enclosure for retaining at least one networking component, the enclosure comprising:
    a shell including a rear wall, a first sidewall, a second sidewall, an upper wall, and a lower wall that cooperate to retain the at least one networking component;
    a cover adapted to operably couple with the shell to define an interior volume;
    at least one venting member defined by a portion of the shell to permit airflow from the interior volume to an exterior environment;
    at least one networking component mounting member adapted to retain the at least one networking component;
    a structure mounting member at least partially disposed on an outer surface of the shell to secure the shell with a portion of a structure; and
    at least one cooling member adapted to circulate air between the exterior environment and the interior volume.

2. The enclosure of claim 1, wherein the cover includes a front plate defining a plane and an upper wall extending therefrom, wherein the upper wall extends obliquely from the plane defined by the front plate.

3. The enclosure of claim 1, wherein the at least one venting member includes a membrane.

4. The enclosure of claim 3, wherein the membrane includes a breathable, waterproof fabric permeable to air and water vapor.

5. The enclosure of claim 1, further comprising at least one radiant barrier coupled with the shell to reduce a UV load within the interior volume from the exterior environment.

6. The enclosure of claim 1, further comprising at least one solar shield coupled with the shell or the cover to redirect a UV load from the exterior environment.

7. The enclosure of claim 1, further comprising a projection wall positioned at or near the rear wall, the projection wall adapted to couple the shell with a building structure such that the rear wall is offset from the building structure.

8. The enclosure of claim 7, wherein the projection wall defines a fiber slack tray having a venting member.

9. The enclosure of claim 1, wherein the at least one networking component comprises an optical network terminal (ONT).

10. A retrofit kit for an enclosure adapted to retain at least one networking component, the retrofit kit comprising:
    a cover including a front plate, a first sidewall, a second sidewall, an upper wall, and a lower wall that cooperate to define a cover interior volume;
    a first venting member at least partially defined by a portion of the upper wall of the cover to permit airflow from the cover interior volume to an exterior environment; and
    a first shield extending from the front plate of the cover and being positioned adjacent to the upper wall thereof;
    wherein the first shield and the upper wall cooperate to define a gap through which air from the cover interior volume may flow to the exterior environment.

11. The retrofit kit of claim 10, wherein the first shield extends obliquely from a plane defined by the front plate.

12. The retrofit kit of claim 11, further comprising a shield extension member positioned at a distal end of the first shield, the shield extension member extending in a downward direction relative to the first shield.

13. The retrofit kit of claim 10, further comprising a second venting member at least partially defined by a portion of the lower wall of the cover to permit airflow from the exterior environment to the cover interior volume.

14. The retrofit kit of claim 13, further comprising a second shield extending from the front plate of the cover, the second shield being positioned adjacent to the lower wall thereof, wherein the second shield and the lower wall cooperate to define a gap through which air from the exterior environment may flow to the cover interior volume.

15. The retrofit kit of claim 10, wherein the first venting member includes a membrane.

16. The retrofit kit of claim 15, wherein the membrane includes a breathable, waterproof fabric permeable to air and water vapor.

17. The retrofit kit of claim 10, further comprising at least one radiant barrier coupled with the cover and/or the shield to reduce a UV load within the interior volume from the exterior environment.

18. The retrofit kit of claim 10, further comprising at least one solar shield coupled with the cover and/or the shield to redirect a UV load from the exterior environment.

19. The retrofit kit of claim 10, further comprising a hinge member adapted to hingedly couple the cover with a shell of an enclosure for retaining the at least one networking component.

20. An enclosure for retaining at least one networking component, the enclosure comprising:
    a shell including a rear wall, a first sidewall, a second sidewall, an upper wall, and a lower wall that cooperate to retain the at least one networking component;
    a cover adapted to operably couple with the shell to define an interior volume;
    at least one venting member defined by a portion of the shell to permit airflow from the interior volume to an exterior environment;
    at least one networking component mounting member adapted to retain the at least one networking component;

a structure mounting member at least partially disposed on an outer surface of the shell to secure the shell with a portion of a structure; and at least one radiant barrier coupled with the shell to reduce a UV load within the interior volume from the exterior environment.

21. An enclosure for retaining at least one networking component, the enclosure comprising:

a shell including a rear wall, a first sidewall, a second sidewall, an upper wall, and a lower wall that cooperate to retain the at least one networking component;

a cover adapted to operably couple with the shell to define an interior volume;

at least one venting member defined by a portion of the shell to permit airflow from the interior volume to an exterior environment;

at least one networking component mounting member adapted to retain the at least one networking component;

a structure mounting member at least partially disposed on an outer surface of the shell to secure the shell with a portion of a structure; and at least one solar shield coupled with the shell or the cover to redirect a UV load from the exterior environment.

22. An enclosure for retaining at least one networking component, the enclosure comprising:

a shell including a rear wall, a first sidewall, a second sidewall, an upper wall, and a lower wall that cooperate to retain the at least one networking component;

a cover adapted to operably couple with the shell to define an interior volume;

at least one venting member defined by a portion of the shell to permit airflow from the interior volume to an exterior environment;

at least one networking component mounting member adapted to retain the at least one networking component;

a structure mounting member at least partially disposed on an outer surface of the shell to secure the shell with a portion of a structure; and a projection wall positioned at or near the rear wall, the projection wall adapted to couple the shell with a building structure such that the rear wall is offset from the building structure.

\* \* \* \* \*